May 25, 1937. E. MENDENHALL ET AL 2,081,550
BEARING
Filed Sept. 26, 1932
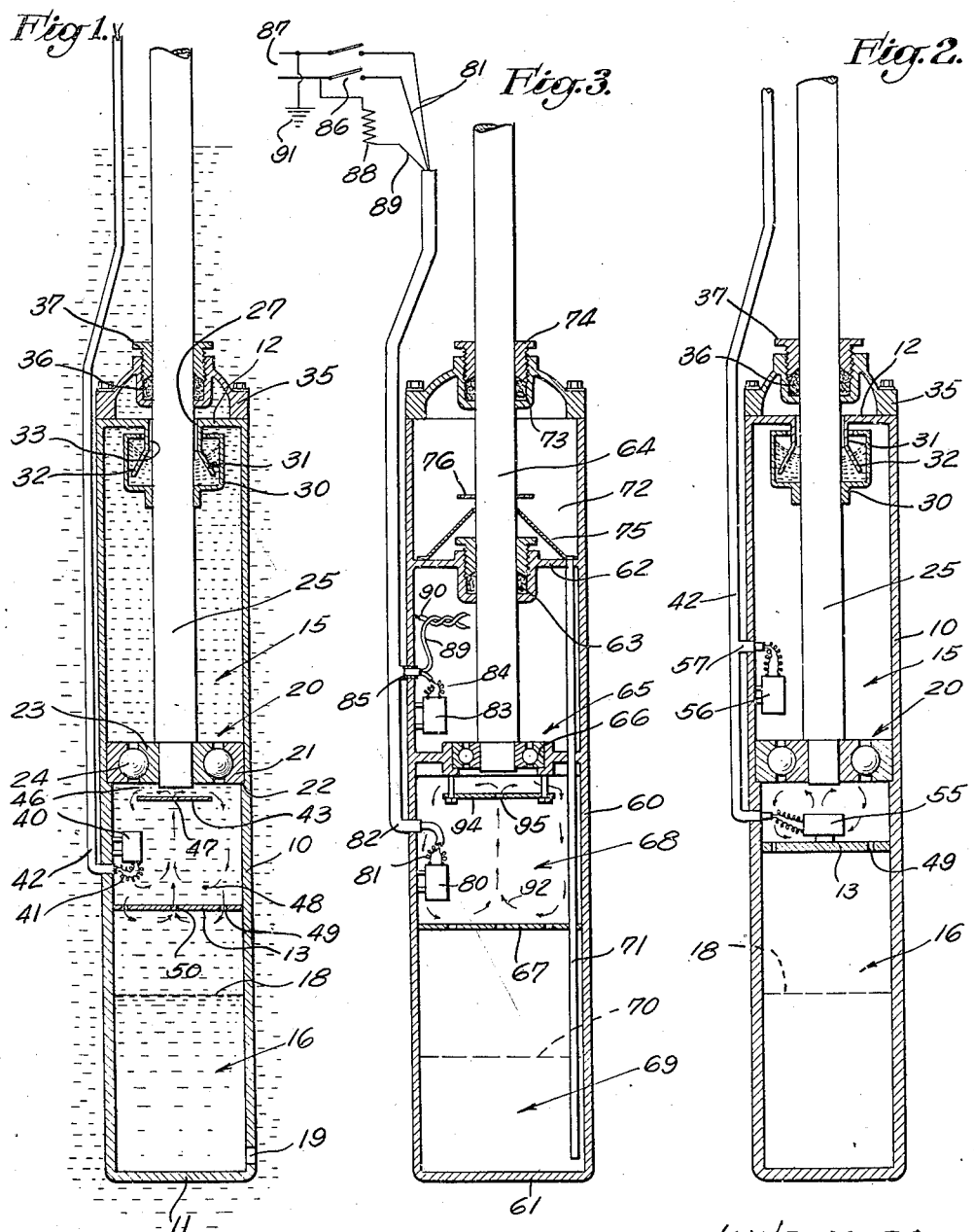
INVENTORS:
EARL MENDENHALL,
JUNIUS B. VAN HORN,
ATTORNEY.

Patented May 25, 1937

2,081,550

UNITED STATES PATENT OFFICE 2,081,550

BEARING

Earl Mendenhall and Junius B. Van Horn, Los Angeles, Calif., assignors, by mesne assignments, to Byron Jackson Co., Huntington Park, Calif., a corporation of Delaware Application September 26, 1932, Serial No. 634,910

14 Claims. (Cl. 308—36.1)

Our invention relates to an improved form of bearing structure in which the bearing is surrounded by oil, and more particularly to a method and apparatus for preventing contamination of the oil.

In many installations it is desirable to be able to journal a rotating shaft at a point beneath a body of liquid. In such installations the liquid in which the bearing is submerged is usually dissimilar to the lubricating medium utilized for journalling the bearing. In some of these installations it is essential that no substantial intermixture of the lubricating liquid and the external liquid take place, and it is an important object of the present invention to prevent such intermixture.

It is often desirable that the external liquid be brought into contact with the lubricating liquid in some portion of the bearing structure. Such a combination finds particular utility when effecting pressure equalization on opposite sides of a sealing means utilized to seal the junction of a rotating shaft and the shell enclosing the bearing. It is another object of the present invention to provide a pressure-equalizing system in which bodies of the lubricating liquid and external liquid are maintained in surface contact with each other and in which intermixture of these liquids is effectively prevented.

There are three ways in which the lubricating medium may become contaminated. In the first place, a leakage through the sealing device around the shaft may cause contamination. In addition, a certain amount of moisture may condense on the interior walls of the shell when the unit is first put into operation. In the third place, we have found that through some action not entirely understood there is a tendency for intermixture of the two liquids to take place at the surface of contact, even though these liquids are maintained in a quiescent state. Our experiments lead us to the conclusion that there is some sort of molecular interchange at this surface of contact, minute amounts of the external liquid becoming associated with the lubricating medium. The contamination due to condensation and leakage through the seal can be controlled by suitable design, but we have found that the tendency to intermix at the surface of contact must be controlled by auxiliary means, and one phase of the present invention is to prevent or control such intermixture.

When a bearing is to operate submerged in a well, for instance, the liquid in the well is ordinarily cool. Our experiments have definitely shown that the temperature inside the bearing shell is a definite factor in controlling the molecular interchange which takes place at the surface of contact of the two liquids. Thus, if an oil of relatively high dielectric strength is utilized as a lubricating medium, the external liquid being water, the contacting bodies of oil and water will be relatively cool. Our experiments have definitely shown that the presence of heat in the bearing shell will definitely decrease the contamination of the oil, and it is an object of the present invention to heat at least a portion of the oil in the bearing chamber.

The invention has two aspects. In the first place, it has been found that by heating the entire contents of the bearing chamber that the amount of contaminating liquid present in the oil will be definitely decreased. Thus, if after long operation, the molecular interchange at the surface of contact has contaminated the oil, we have found that the application of heat to the interior of the bearing structure will decrease the amount of the contaminating agent present. Thus, in the event that the bearing is submerged in water the oil will be definitely dried out when heat is applied. It is not essential, however, that the degree of heat be such as to actually vaporize the water or other contaminating liquid. Quite to the contrary, very satisfactory results are obtained at temperatures materially below the boiling point of water.

It is an object of the present invention to provide a method and apparatus whereby a contaminated lubricating liquid which is in surface contact with the contaminating medium may be effectively purified by the application of heat.

Our experiments have also shown the presence of another very definite factor; namely, that the application of heat to a portion of the liquid spaced from the surface of contact will be effective not only to purify the lubricating liquid, but also to prevent further contamination through the molecular interchange at the surface of contact.

It is an object of the present invention to apply heat to only a portion of the liquid inside the bearing chamber, maintaining the temperature at the surface of contact somewhat lower than the temperature of the heated portion. Thus, the upper end of the bearing chamber may very conveniently comprise an auxiliary zone at which the heat is applied, while the lower end of the bearing structure may include a balance chamber in which the liquids are in surface contact with each other.

It is a further object of the invention to circulate the lubricating medium relative to the heating means utilized, and to shield the balance chamber with its contacting bodies of the two liquids from excessive agitation. On the other hand, it is desirable to maintain a small amount of circulation from the heating zone into the balance chamber, and it is another object of the invention to provide a system in which this is accomplished.

A further object of the invention is to provide a system in which the heating means is automatically set into operation when the lubricating medium becomes contaminated.

Other features of the invention are also novel, such, for instance, as the structural details of the bearing structure, as well as the system disclosed hereinafter and acting to separate any intermixture which takes place at the seal.

Further objects and advantages of the invention will be made evident hereinafter.

It should not be understood, however, that the invention finds utility only in conjunction with a bearing structure. Its use in other capacities wherein liquids are maintained in pressure-equalizing contact or otherwise communicate with each other also falls within the scope of the present invention.

Referring to the drawing,—

Figs. 1, 2, and 3 illustrate sectional views of three forms of the bearing structure.

Referring particularly to Fig. 1 we have shown a shell 10 closed at its lower end by a plate 11 and at its upper end by a wall 12, these elements thus cooperating in defining a chamber. A baffle 13 extends across the shell 10 at an intermediate section to divide the interior of this shell into a bearing chamber 15 and a balance chamber 16. The bearing chamber is substantially filled with oil or other lubricating medium, while the balance chamber 16 contains contacting bodies of the lubricating liquid and the liquid in which the bearing structure is submerged, these liquids separating at a surface of contact 18 due to the fact that these liquids are of different density. For the purpose of definiteness, and without limiting ourselves thereto, we will hereinafter speak of the lubricating medium as comprising oil and the external liquid as comprising water. In this event, the liquid above the surface of contact 18 will comprise oil, while the liquid therebelow will comprise water, the water having access to the balance chamber through an opening 19 in the lower end of the shell, it being understood that the shell is submerged in the water as indicated in Fig. 1. The balance chamber 16 thus serves to equalize the pressures on the oil and water, thus incidentally equalizing the pressures inside and outside of the shell 10.

Positioned in the bearing chamber 15 is a bearing 20 illustrated as comprising an outer race 21 engaging a shoulder 22 of the shell, and an inner race 23 journalled with respect to the outer race 21 by ball bearings 24. A shaft 25 snugly engages the inner race 23 and extends upward through an opening 27 of the wall 12.

A suitable seal is provided to seal the junction of the shaft 25 and this wall 12. The type of seal shown in Fig. 1 includes a cup member 30 secured to the shaft and retaining a body of mercury or other sealing liquid therein. A skirt 31 extends downward from the wall 12 and provides a flared portion 32 which extends beneath the surface of the body of sealing liquid retained in the cup 30. This skirt 31 is spaced from the periphery of the shaft to define an annular space 33 which has access to the water or other external liquid. It will thus be clear that the skirt 31 separates the oil in the shell from the water which surrounds the shell. In turn the skirt 31 divides the surface of the sealing liquid into two portions, the outer portion being contacted by the oil in the shell, and the inner portion communicating with the annular space 33 to be contacted by the water.

If desired a dome 35 may be positioned above the wall 12 and suitably secured to the shell 10. This dome may include a chamber retaining a packing 36 around the shaft 25. A gland 37 may be utilized to adjust this packing. It should be understood, however, that the function of the packing 36 is to prevent sand or other foreign material from entering the annular space 33. It is not intended that this packing should prevent water from entering the annular space 33 so that it is not necessary to continuously adjust the gland 37.

In experimenting with such a structure to definitely ascertain the extent to which intermixture takes place, we have installed extremely sensitive moisture-indicating means throughout the body of oil. These devices, being much more sensitive than previously known indicating devices, have permitted a very accurate determination of the moisture content in different portions of the body of oil. Our tests definitely indicate that if the entire structure is kept relatively cool, say, for instance, in the neighborhood of 10 to 20° C., the oil will become contaminated by the water, even though the surface of contact is entirely quiescent. The moisture-indicating means utilized indicate that the moisture content first becomes higher in the upper end of the balance chamber, and after the lapse of sufficient time, this moisture content increases throughout the bearing chamber so that progressively higher levels in the bearing chamber are contaminated. This definitely indicates that there is some action at the surface of contact 18 which can only be explained by the presence of some molecular interchange, a portion of the water molecules migrating upward into the body of oil. However, if the oil inside the bearing chamber is heated, the moisture-indicating means will definitely show a decrease in moisture content.

Further, the rotation of the shaft 25 does not appear to change these conditions except that this rotation circulates the oil in the bearing chamber in such a way that the moisture content throughout the entire body of oil in the bearing chamber is substantially uniform. This moisture content will increase after the bearing has been operated and if the liquids are maintained in a cool condition. This is true even though the bodies of oil and water in the balance chamber are maintained in a quiescent state.

In Fig. 1 there is illustrated one manner in which the heat may be applied to a bearing structure to decrease the moisture content of the oil and to prevent further contamination. In this form of the invention a heater 40 is positioned between the baffle 13 and the lower end of the shaft 25. This heater may be of any desired variety, the type shown being electrically operated and being supplied with current through a pair of conductors 41 extending upward in a pipe 42 which extends above the surface of the water or other surrounding liquid, the upper end of these conductors being connected to a suitable source of potential. The rotation of the shaft 25 normally tends to circulate the oil in the bearing chamber 15, but if desired this circulation may be increased by the use of a baffle 43 positioned below the lower end of the shaft 25 so as to cooperate therewith in providing a radially extending pumping space 46. An opening 47 may be drilled in the center of the baffle 43. When the shaft is rotating the oil in the pumping space 46 will be thrown outward by centrifugal force thus setting up a circulation, as indicated by arrows 48, the oil returning through the opening 47. It will be noted that the heater 40 is positioned in the path of this circulation. In addition, the entire body of oil in the bearing chamber 15 is slowly rotated due to the skin friction of the surface of the shaft, so that all portions of the oil above the baffle 13 are circulated adjacent the heater 40 either by mechanical forces or through thermal action.

It is always desirable that the balance chamber 16 communicate with the bearing chamber 15 through one or more relatively small ports. In Fig. 1, we have disclosed a system of ports which permits a minute circulation of the heated oil into and from the upper portion of the balance chamber 16. One manner of accomplishing this end is to drill several openings 49 through the baffle 13 near the periphery thereof and to provide a single opening 50 in the center thereof. The heated oil will thus tend to circulate downward in the openings 49 and upward through the opening 50. It will be understood, however, that this circulation tendency is extremely small and that the agitation set up thereby is insufficient to agitate the surface of contact 18 to any material degree. If necessary, the balance chamber 16 can be made longer, thereby allowing the surface of contact 18 to be positioned a further distance below the baffle 13.

One factor which appears to have an important bearing upon the problem of maintaining the oil in an uncontaminated condition is to maintain a difference of temperature between the bearing chamber 15 and the balance chamber 16. Any moisture carried by the oil as it moves downward through the openings 49 will tend to be removed when it reaches the cool liquid in the balance chamber. In this connection, it will be clear that the heater 40 does not act to materially heat the liquids in the balance chamber 16. This is due both to the heat-insulating qualities of the baffle 13 and to the fact that only a minute amount of oil is circulated into the upper end of the balance chamber, and also to the cooling action of the well liquid around the shell 10. The temperature in the balance chamber is ordinarily materially lower than the temperature in the bearing chamber 15, and this mode of operation has been found to give the most desirable results. The difference in temperature between the oil in the bearing chamber and the liquids in the balance chamber is not critical. This temperature may be several degrees or as high as 50 to 70° C., the difference in action being merely one of degree.

In Fig. 2 we have illustrated a similar bearing structure including two heating means, one being indicated by the numeral 55 and being mounted on the upper face of the baffle 13, and the other being indicated by the numeral 56 and being positioned above the bearing 26. In this form of the invention, the pipe 42 provides a branch 57 carrying the conductors which supply current to the upper heater 56. The action of this form of the invention is very similar to that shown in Fig. 1, but the presence of two heaters is sometimes advantageous in producing a quick or more evenly distributed heat.

In Fig. 3 we have shown another form of the invention including a shell 60 closed at its lower and upper ends by walls 61 and 62, the wall 62 carrying a packing 63 which acts to seal a shaft 64 with respect to the wall 62. The lower end of the shaft 64 is journalled in a bearing 65 retained in a cup 66 suitably secured to the shell 60. The upper end of the shell is filled with oil, as previously described, while a baffle 67 divides the interior of the shell into a bearing chamber 68 and a balance chamber 69 in a manner previously described. The balance chamber contains contacting bodies of oil and water engaging each other at a surface of contact 70.

A pipe 71 opens on the balance chamber at a point below the surface of contact 70 and extends upward in spaced relationship with the inner wall of the shell 60 and communicates with a chamber 72 formed in the shell 60 above the wall 62. This chamber is partially but not completely sealed from the surrounding water by means of a seal in the form of a packing 73 compressed by a gland 74. The main function of this packing is to prevent sand or other solid matter from reaching the chamber 72. The chamber 72 is originally filled with oil, but upon continued operation of the bearing, the water and oil will become mixed in the packing 73, and this intermixture will enter the chamber 72. A baffle 75 extends upward from the wall 62 to closely surround the shaft 64 and guide the intermixture downward and into the pipe 71 whence it drops to the balance chamber 69 and is therein separated. The rotation of the shaft 64 also tends to throw this intermixture outward as soon as it is formed in the chamber 72. This action may be assisted by a disc 76 rotating with the shaft 64. The upper end of the packing 63 is thus protected from this intermixture.

Positioned below the shaft 64 and above the baffle 67 is a heater 80 supplied with current through conductors 81 extending upward in a pipe 82. Another heater 83 is positioned above the bearing 65 and is supplied with current by conductors 84 which extend through a branch pipe 85 and are connected in parallel with the conductors 81. A magnetically operated switch 86 supplies current from a line 87 to the conductors 81, the switch being closed when a solenoid 88 thereof is energized.

The switch 86 is automatically closed when the oil becomes contaminated, this being accomplished by the use of a third conductor 89 extending downward through the pipe 82 and the branch 85 and into the bearing chamber 68, as shown in Fig. 3. Another conductor 90 is grounded to the shell 60 and the conductors 89 and 90 are twisted together in the bearing chamber as diagrammatically shown in Fig. 3, the ends of these conductors being dead-ended as shown. The portions of the conductors 89 and 90 which are twisted together are preferably formed of cotton-covered wire so that the metals in the conductors 89 and 90 are separated from each other by the cotton insulation. This cotton insulation has an affinity for moisture and even a slight amount of moisture in the oil will very materially decrease the resistance between the conductors 89 and 90. Thus, by grounding one of the conductors of the line 87 as indicated by the numeral 91, and by connecting the through conductor of this line in series with the solenoid 88 and the conductor 89, it will be clear that an increase in moisture content in the oil will tend to short-circuit the conductors 89 and 90 thereby increasing the current through the solenoid 88 of the switch 86. This will close the switch and apply a current to the heaters 80 and 83, this current being maintained until the moisture content of the oil is reduced to such a value that the current through the solenoid 88 is insufficient to maintain the switch closed. It has been definitely shown that as the moisture content of the oil is decreased, the resistance between the conductors 89 and 90 will correspondingly increase. It should not be understood, however, that it is necessary to utilize the current flowing between the conductors 89 and 90 for directly operating the solenoid 88. Any suitable relay may be utilized which is responsive to the current between the conductors 89 and 90, this relay in turn acting to energize the solenoid 88 to close the switch 86.

In the operation of this form of the invention the heaters 80 and 83 act to maintain the oil in the bearing chamber 68 at a temperature above the temperature of the liquids in the balance chamber 69. Any intermixture of the oil and water which takes place adjacent the packing 73 moves down through the pipe 71. Such an intermixture is thus heated as it moves downward therein and is suddenly chilled when it enters the balance chamber 69. This action tends to precipitate the moisture from the intermixture, the moisture entering the body of water in the balance chamber and the oil moving upward therethrough and into the bearing chamber 68.

So also, in this form of the invention the oil is circulated through a circulation path as indicated by the arrows 92, this circulation being downward in the outer portion of the shell and upward in the inner portion thereof. The heater 80 is positioned directly in this circulation path. If desired a baffle 94 may extend across the lower end of the shaft 64, as previously described, this baffle including a central opening 95 through which the rising oil passes. So also, the baffle 67 may be provided with openings similar to those shown in Fig. 1 so that a minute amount of the circulation enters the upper end of the balance chamber 69. Any moisture which is carried in this minute circulation thus tends to be precipitated in the balance chamber 69, the dry oil moving upward in the central opening of the baffle 67 and into the bearing chamber 68.

As previously set forth the heaters 80 and 83 can be operated continuously or intermittently. If desired, the moisture-responsive means may be utilized to intermittently operate these heaters to effect the desired result. It should not be understood, however, that such intermittent operation is in all events necessary for in some instances it is desirable to continuously supply current to the heating means 80 and 83 to settle out any intermixture which is formed and to prevent the formation of additional intermixture due to a molecular interchange at the surface of contact 70 or a mixture formed by the sealing means of the invention.

We claim as our invention:
1. In a submersible bearing structure, the combination of: a shell defining a bearing chamber and being submerged in water, said bearing chamber containing a lubricating medium; a bearing in said bearing chamber; a shaft journalled in said bearing and extending upward from said shell; walls defining a balance chamber in the lower end of said shell below the lower end of said shaft and communicating at one end with said bearing chamber and communicating at its other end with said water to contain contacting bodies of said water and said lubricating medium, said water and said lubricating medium being of different density and being relatively immiscible so as to separate in said balance chamber at a surface of contact; and heating means spaced from said surface of contact for heating the lubricating medium in said shell to prevent excessive amounts of said water entering said lubricating medium at said surface.

2. In a submersible bearing structure, the combination of: a shell submerged in water and containing contacting bodies of water and a lubricating liquid; a shaft extending from said shell; a bearing in said shell and journalling said shaft; a sealing means at the junction of said shaft and said shell; means conducting any intermixture formed by said sealing means into the vicinity of the surface of contact of said bodies of said liquids; means for heating the intermixture which moves through said last-named means whereby the constituents of said intermixture separate and respectively enter said bodies of water and lubricating liquid; and means communicating between said water in which said shell is submerged and said body of water in said shell to conduct excess water from said shell.

3. In a submersible bearing structure, the combination of: a shell submerged in water and containing a lubricating liquid; a shaft extending from said shell; sealing means at the junction of said shaft and said shell; heating means for separating any intermixture of said water and said lubricating liquid formed in said shell; and means responsive to the amount of said water intermixed with said lubricating liquid for controlling said heating means to heat said intermixture when the proportion of water therein increases.

4. In a submersible bearing structure, the combination of: a shell submerged in water and containing contacting bodies of oil and water; a shaft extending from said shell; a bearing in said shell and journalling said shaft; a sealing means at the junction of said shaft and said shell; walls defining a passage extending in said shell from a position adjacent said sealing means to the zone containing said contacting bodies of oil and water and thus conducting to said zone any intermixture of said oil and water formed adjacent said sealing means; and means for heating the intermixture moving in said passage.

5. In a submersible bearing structure, the combination of: stationary walls forming a shell submerged in water and providing a chamber containing contacting bodies of oil and water; a movable shaft extending from said shell; a bearing in said shell and journalling said shaft; a sealing means at the junction of said shaft and said shell and forming an intermixture of said oil and water; and walls defining a passage receiving said intermixture and extending into said body of water in said shell to discharge said intermixture in said body of water in spaced relationship with the surface of contact of said oil and water.

6. In a bearing structure, the combination of: a shell containing a lubricating medium; a baffle in said shell to divide the interior of said shell into a bearing chamber and a balance chamber, said balance chamber containing contacting bodies of said lubricating medium and water, said baffle bounding intake and discharge ports; a bearing in said bearing chamber; and a shaft journalled in said bearing and circulating said lubricating medium to move at least a portion thereof from said bearing chamber through said intake port and into said balance chamber and then from said balance chamber through said discharge port into said bearing chamber.

7. A method of maintaining the integrity of a body of oil agitated and circulated by a rotatable means and a bearing means therefor and contacting a body of water, which method includes the steps of: shielding the surface of contact of said oil and water from said agitation set up by said rotatable means and said bearing means to maintain quiescent contact of said oil and water at said surface of contact, said body of oil still tending to be contaminated by said water at said quiescent surface of contact; applying heat to a portion of said body of oil at a position spaced from said surface of contact; and maintaining those portions of said water and said oil adjacent said surface of contact cool so that a temperature differential of at least several degrees centigrade exists between the heated portion of said oil and the surface of contact of said oil and water.

8. A method of maintaining the integrity of a body of oil which tends to become contaminated with water, bodies of said oil and water being in surface contact in a chamber containing a rotating means and journalling means tending to agitate and more intimately mix any water-oil mixture which may be formed, which method includes the steps of: applying heat to said body of oil at a position spaced from said surface of contact; and maintaining the oil and water adjacent said surface of contact cooler than the oil in said position at which heat is applied.

9. A method of maintaining the integrity of a lubricating medium comprising a first liquid which tends to become contaminated by water forming a second dissimilar liquid, bodies of these liquids being in surface contact in a chamber containing a moving means and a journalling means therefor, said means tending to agitate and more intimately mix any mixture of said liquids which may be formed, which method includes the steps of: applying heat to said body of first liquid at a position spaced from said surface of contact; maintaining said liquids in a zone adjacent said surface of contact materially cooler than the first liquid in said position at which heat is applied; and introducing small amounts of the heated first liquid comprising said lubricating medium into said cooler zone.

10. A method of maintaining the integrity of an oil which tends to become contaminated by water, bodies of these liquids being in surface contact in a chamber containing a moving means and a journalling means therefor, said means tending to agitate and more intimately mix any mixture of said liquids which may be formed, which method includes the steps of: applying heat to said body of oil at a position spaced from said surface of contact; and cooling said liquids adjacent said surface of contact by surrounding said chamber with a cool body of liquid.

11. A method of preventing contamination of a body of oil surrounding a bearing by water, said oil and water being in surface contact, which method includes the steps of: moving said oil through a circulation path spaced from the surface of contact of said oil and water; heating the oil moving through said circulation path; withdrawing small quantities of said heated oil from said circulation path and introducing same into a zone adjacent said surface of contact; and maintaining said zone cooler than the temperature of said quantities of heated oil introduced thereinto.

12. A method of operating a bearing structure including a bearing-containing chamber with a body of oil therein agitated by rotation of a shaft journalled in said bearing and including a cool zone in which a body of said oil is in surface contact with a body of water, which method includes the steps of: forming an intermixture of oil and water at a section spaced from said cool zone in which said bodies of oil and water are in contact; conducting said intermixture to said cool zone in spaced relationship with said agitated oil; and heating said intermixture before it enters said cool zone whereby said intermixture is chilled upon entering said cool zone to remove the water from the oil in said intermixture.

13. A method of operating a water-submerged bearing structure providing a main bearing-containing chamber containing oil and having access to small quantities of water thereby tending to form an intermixture of oil and water, said bearing structure providing another chamber containing bodies of said oil and water in quiescent contact, said chambers communicating with each other to permit communication between said body of oil in said other chamber and said oil in said main chamber, which method includes the steps of: developing a temperature differential between said chambers to maintain the temperature in said main chamber at least several degrees centigrade higher than the temperature adjacent said surface of contact; and moving a portion of said higher-temperature oil from said main chamber into the cooler chamber in which is positioned said surface of contact.

14. In a submersible bearing structure, the combination of: a shell submerged in water and containing a lubricating medium; a bearing in said shell; a shaft extending from said shell; a semi-effective sealing means at the junction of said shaft and said shell and forming an intermixture of said water and said lubricating medium; and means for separating the constituents of said intermixture, said means including a heating means for heating said intermixture and including walls forming a balance chamber in said shell and receiving said intermixture, said balance chamber containing stratified bodies of said lubricating medium and said water, into which balance chamber the constituents of said intermixture move, whereby these constituents join their respective bodies and are thus separated.

EARL MENDENHALL.
JUNIUS B. VAN HORN.